W. WRIGHT.
WHEEL FOR VEHICLES.
APPLICATION FILED JUNE 15, 1914.
1,247,199.
Patented Nov. 20, 1917.
5 SHEETS—SHEET 1.
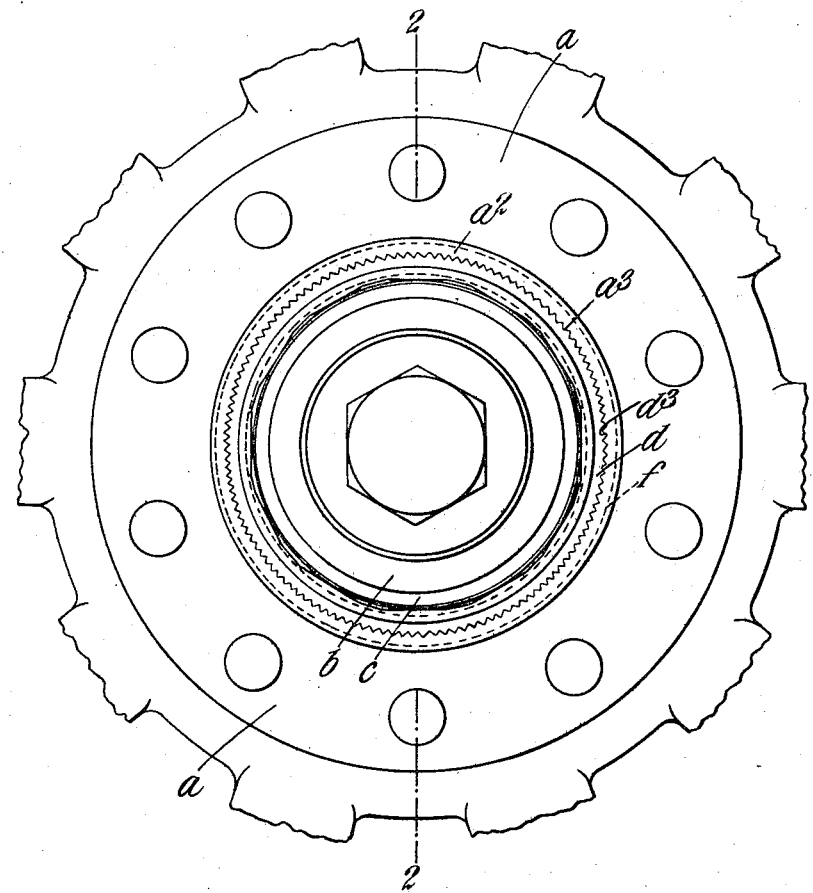
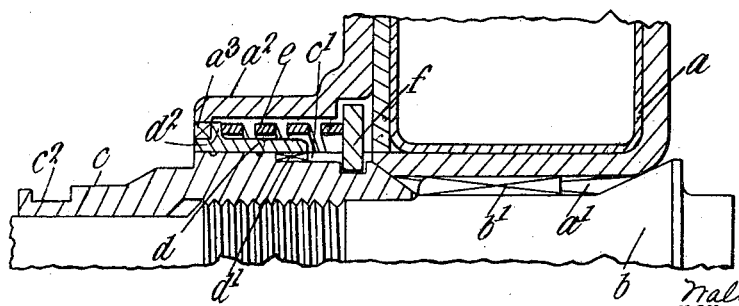
Witnesses:
Inventor
Walter Wright
per
H. W. Waghorn
Attorney W. WRIGHT.
WHEEL FOR VEHICLES.
APPLICATION FILED JUNE 15, 1914.
1,247,199.
Patented Nov. 20, 1917.
5 SHEETS—SHEET 2.
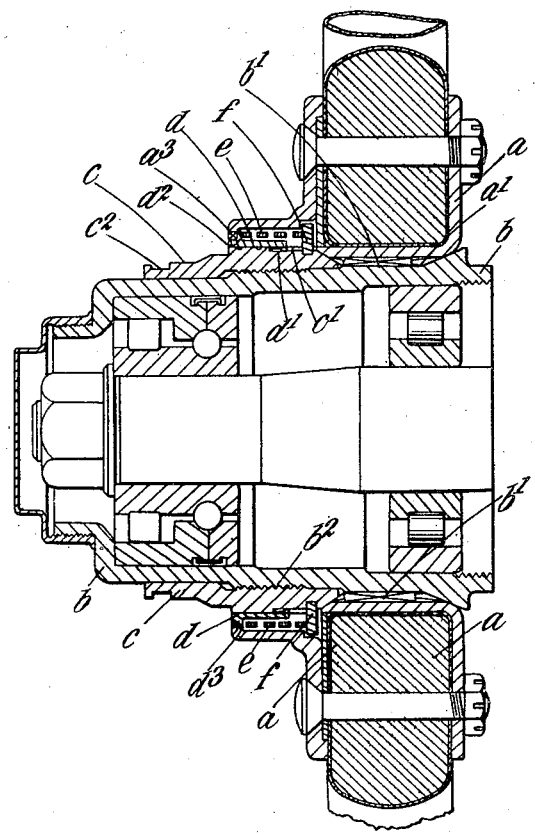
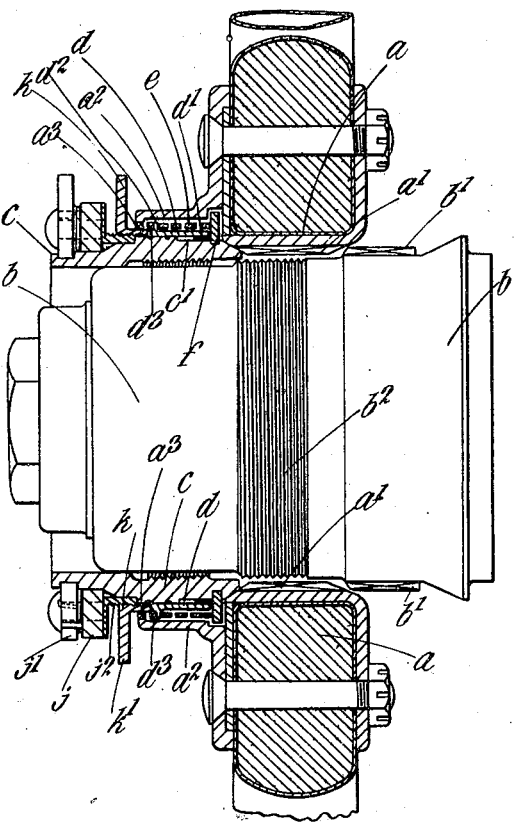
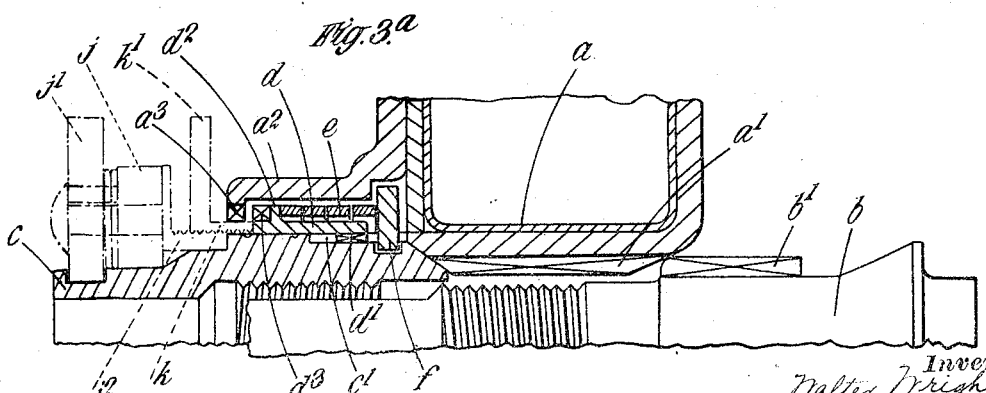

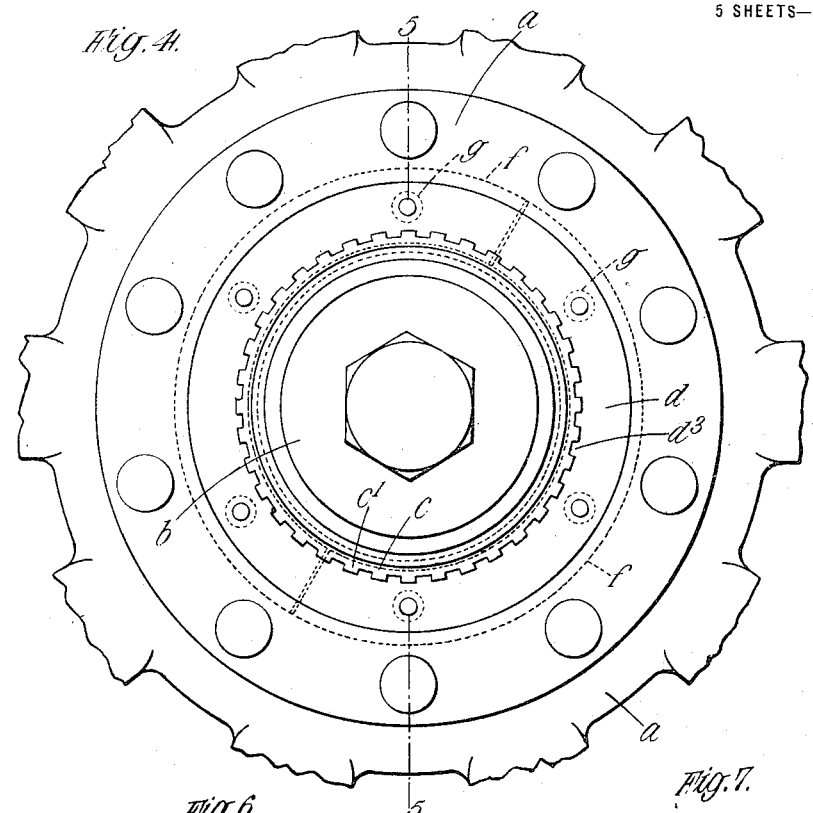
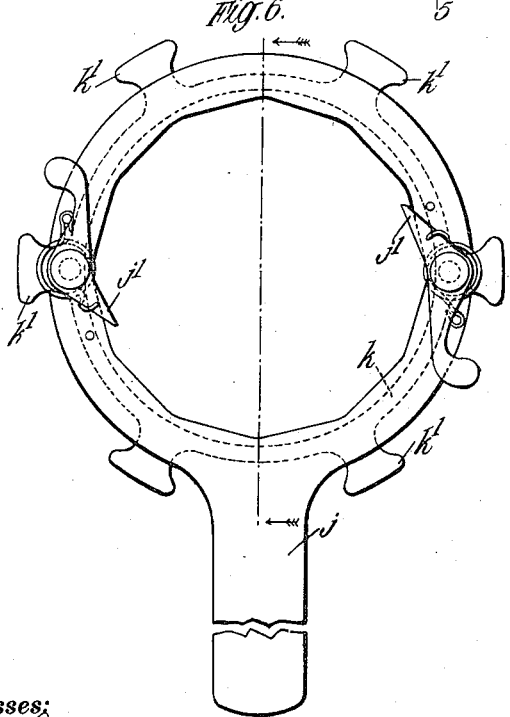
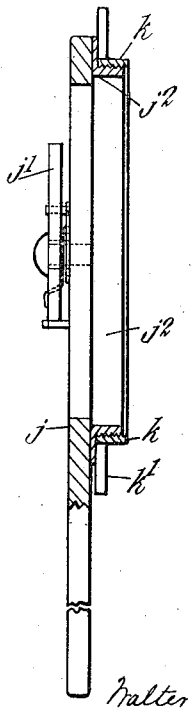

W. WRIGHT.
WHEEL FOR VEHICLES.
APPLICATION FILED JUNE 15, 1914.

1,247,199.

Patented Nov. 20, 1917.
5 SHEETS—SHEET 4.

Witnesses:
M. J. Whittaker
G. M. Hulet

Inventor:
Walter Wright
per
H. W. Waghorn
Attorney.

W. WRIGHT.
WHEEL FOR VEHICLES.
APPLICATION FILED JUNE 15, 1914.
1,247,199.
Patented Nov. 20, 1917.
5 SHEETS—SHEET 5.
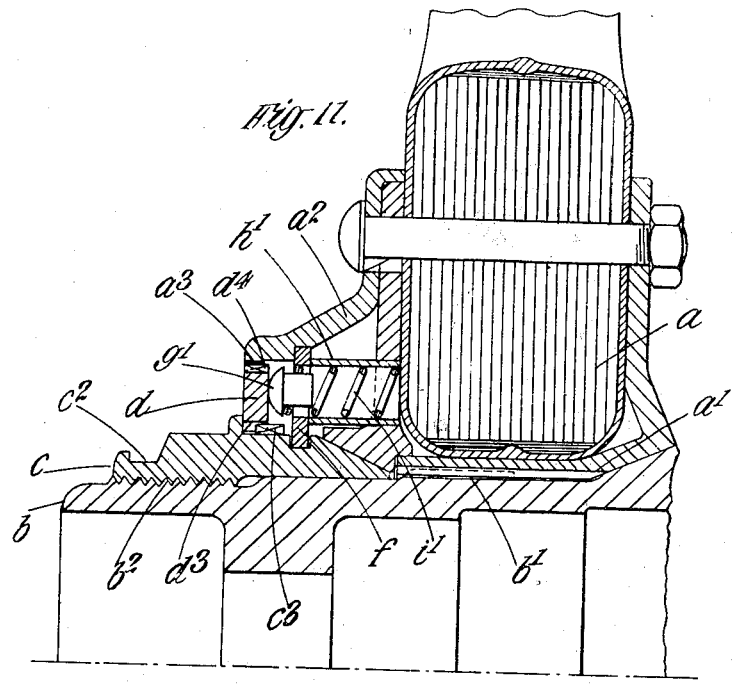
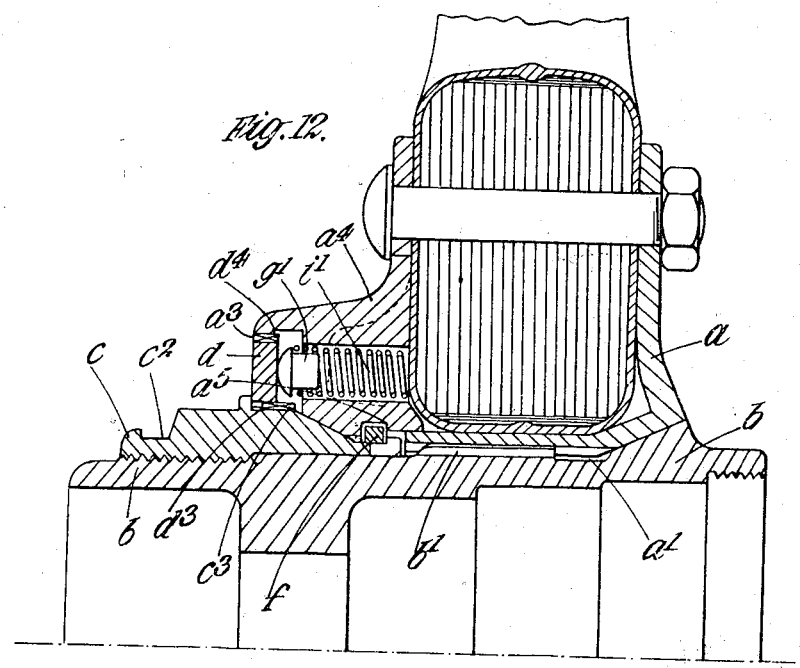
Witnesses:
M. J. Whittaker
G. McHulet
Inventor.
Walter Wright.
per
H. W. Waghorn
Attorney.

UNITED STATES PATENT OFFICE.

WALTER WRIGHT, OF COVENTRY, ENGLAND, ASSIGNOR TO THE DUNLOP RUBBER COMPANY, LIMITED, OF LONDON, ENGLAND.

WHEEL FOR VEHICLES.

1,247,199.  Specification of Letters Patent.  Patented Nov. 20, 1917.

Application filed June 15, 1914. Serial No. 845,130.

*To all whom it may concern:*

Be it known that I, WALTER WRIGHT, a subject of the King of Great Britain, residing at Alma street, Coventry, in the county of Warwick, England, have invented certain new and useful Improvements in Wheels for Vehicles, of which the following is a specification.

This invention relates to vehicle wheels of the kind wherein an outer hub or shell carrying the spokes and rim, is readily detachable from an inner hub, when a locking member that normally retains the two hubs secured together is released or actuated.

According to this invention the locking member is carried by or mounted on the detachable hub. In some cases the locking member may be carried by a rotating member or nut which may be screwed onto the inner hub, to retain the outer hub in position, the said locking member being adapted to positively lock the nut against rotation when the latter is in the required position. The detachable hub is secured against rotation on the inner hub and the locking member may engage with a portion of the detachable hub and with the retaining member or nut. Suitable releasing or unlocking means are provided for disengaging or actuating the locking member and may be conveniently combined with a spanner or similar tool for actuating the retaining member or nut.

In order that the said invention may be clearly understood and readily carried into effect the same will now be described fully with reference to the accompanying drawings, in which:—

Figure 1 is a front elevation of a wheel hub showing one form of the improved construction.

Fig. 2 is a vertical sectional view taken on the line 2—2 of Fig. 1, part of the figure being shown on an enlarged scale in the detail view Fig. 2ª.

Fig. 3 is a similar view to Fig. 2 showing the detachable hub portion of the wheel partly removed from the inner hub, and Fig. 3ª is an enlarged detail view.

Figs. 4 and 5 are respectively a front elevation and a vertical section of a modified construction, the latter view being taken on the line 5—5 of Fig. 4; Fig. 5ª is a detail view.

Figs. 6 and 7 are respectively a front view and a vertical section of one form of spanner combined with the releasing or unlocking means for manipulating the locking member.

Figure 6:
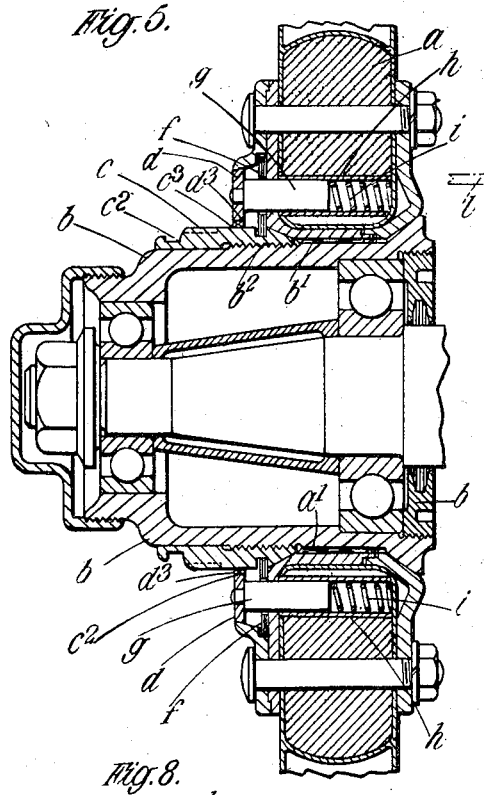
Figure 6A:
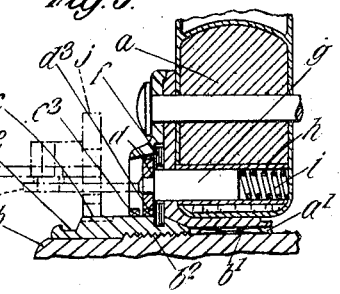
Figure 8:
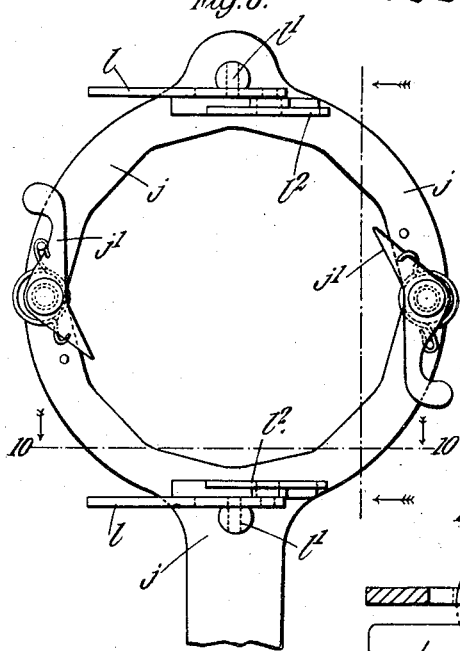
Figure 9:
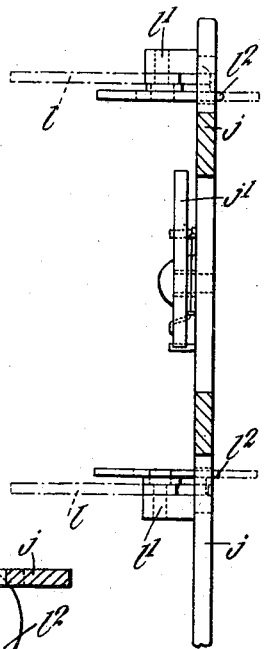
Figure 10:
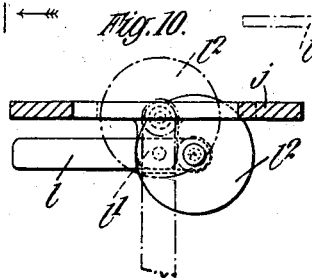

Figs. 8 and 9 are similar views to Figs. 6 and 7 illustrating a modified form of spanner, and Fig. 10 is a sectional plan taken on the line 10—10 of Fig. 8.

Figs. 11 and 12 are fragmentary sectional views of modifications similar to the construction shown in Figs. 4 and 5.

Throughout the aforesaid figures like letters of reference designate similar or corresponding parts.

$a$ is the detachable outer hub or wheel which in the example shown is a pressed steel wheel; $b$ is the inner hub of more or less usual construction adapted to receive the detachable outer hub $a$; $c$ is the retaining member or nut which is shown as adapted to be screwed onto an externally threaded portion of the inner hub and $d$ is the locking member which in the examples shown is of annular formation and interposed between the said nut $c$ and the detachable hub $a$.

The detachable hub $a$ is capable of axial movement on the inner hub $b$ but is prevented from rotating relatively thereto by longitudinal teeth or projections $a'$ thereon which engage with similar teeth or projections $b'$ on the inner hub $b$, the said inner hub being externally screw threaded at $b^2$ to receive the nut $c$. In the example shown in Figs. 1 to 3 the detachable hub $a$ is provided with an outwardly projecting flange $a^2$, the outer peripheral portion of which is provided with an annular row of teeth $a^3$. The locking member $d$ in this modification, is in the form of a cylinder or ring surrounding the nut, and is adapted to slide axially on the latter, but is held against rotation relatively thereto by longitudinal teeth $d'$ which engage with longitudinal grooves $c'$ in the nut. An annular projection $d^2$ is provided on the locking member $d$ and an annular row of teeth $d^3$ are formed adjacent to the said projection $d^2$ which teeth are adapted to engage or mesh with the teeth $a^3$ under the influence of a suitable spring $e$ surrounding the locking member and disposed between the latter and a suitable part of the detachable hub $a$ or the nut $c$. The nut $c$ is shown as being rotatably connected to the detachable hub $a$ by means of a flat ring $f$ loosely situated in annular grooves or recesses in the said detachable hub and the nut, and when this ring is employed the said spring may be disposed between the ring $f$ and the annular projection $d^2$ on the locking member $d$ (see Figs. 2 and 3).

When the detachable hub is properly secured in position on the inner hub as shown in Figs. 2 and 2ª and the nut $c$ is fully screwed on to the inner hub, the teeth $d^3$ on the locking member $d$ are maintained in engagement with teeth $a^3$ on the detachable hub by the spring $e$; therefore the nut cannot be rotated as it is secured to the detachable hub which as aforesaid is held against rotation relatively to the inner hub by the teeth $a'$ $b'$.

In order to remove the detachable hub, the locking ring must be pushed and held inwardly against the action of the spring to effect the unlocking or disengagement of the teeth $a^3$. $d^3$, thus enabling the nut to be rotated, and when the nut moves axially along the inner hub in the outward direction, the detachable hub is drawn along the inner hub by the flat ring $f$ loosely connected to the said nut and to the detachable hub as aforesaid.

The modifications illustrated in Figs. 4, 5, and 5ª are similar in general construction and operation to that shown in Figs. 1 to 3, but the locking member $d$ which in this case may be in the form of a flat ring is mounted on or carried by the detachable hub instead of being carried by the nut $c$ as in the former example. The locking member or ring $d$ in this example is provided with an internal peripheral row of teeth $d^3$ which is normally held in engagement with an annular external row of teeth $c^3$ on the nut $c$ by a number of axially movable plungers $g$ mounted in sleeves or casings $h$ and pressed outwardly by springs $i$. The said plungers $h$ extend through openings in a flat connecting ring $f$ which secures the nut $c$ to the detachable hub $a$ as described in connection with the previous example. In both constructions, the connecting ring $f$ can be dispensed with so that the nut $c$ and detachable hub $a$ are separate and, in this case the detachable hub would be slidably moved relatively to the hub independently of the operation of the nut $c$.

For the purpose of manipulating the locking member $d$ and rotating the nut $c$, the spanner $j$ shown in Figs. 6 to 9 may be employed with any of the constructions described above. The spanner is provided with spring controlled pawls $j'$ which engage with an annular external groove $c^2$ in the nut $c$ (see Figs. 2 and 5) when the spanner is in position thereon and the releasing device or devices are mounted on the spanner to operate the locking ring. In the spanner shown in Figs. 6 and 7 the releasing device is in the form of an annular member or short sleeve $k$ screwed onto a threaded extension $j^2$ of the spanner and capable of axial movement thereon, for which purpose projections $k'$ are provided on the sleeve to enable the latter to be adjusted when the spanner is in position on the nut. By rotating the sleeve $k$ in the required direction it presses against the outer or exposed face of the locking member $d$ and pushes the same inwardly against its spring $e$ or springs $i$, so that the locking member is moved into the released or disengaged position and the nut is then free to be rotated by the spanner $j$. When the spanner is removed the spring $e$ forces the locking member outwardly to effect the locking of the detachable hub as aforesaid. The spanner shown in Figs. 8 and 9 is provided with two releasing or unlocking devices in the form of hand levers $l$ $l$ pivoted at $l'$ $l'$ and carrying thrust pieces $l^2$ $l^2$ which can be moved to press the locking ring inwardly when the hand levers $i$ are angularly displaced to the position shown in dotted lines in Figs. 8 and 10.

With reference to the modification shown in Figs. 11 and 12 the locking ring $d$ is adapted to be secured to the nut $c$ so as to rotate with the latter when being revolved by the spanner. Thus the unlocking devices on the spanner which engage with the outer or exposed face of the locking ring do not mark or abrade the plating or polish on the said face during the rotation of the nut, as would be the case if the locking ring were held stationary. For this purpose the teeth $c^3$ on the nut are elongated or set back and the teeth $d^3$ on the locking ring are similarly formed so as to remain in engagement or mesh with the teeth $c^3$ on the nut even if in the locked or unlocked position. The locking ring $d$ is also provided with teeth $d^4$ which engage with teeth $a^3$ on the flange $a^2$ forming part of the outer hub $a$ in order to effect the locking of the nut $c$ to the detachable or outer hub $a$. A series of spring pressed plungers $g'$ is provided for maintaining the locking ring in the outward or locked position and as shown in Fig. 11 the springs $i$ may be contained within the casings $h'$, and adapted to press the plungers $g'$ through holes in the connecting ring $f$ into contact with the rear or inner face of the locking ring. In the modification illustrated in Fig. 12 the general construction is similar to that shown in Fig. 11 but the springs $i'$ associated with the plungers $g'$ are disposed within holes or recesses formed in extensions $a^4$ on the outer hub. The connecting ring $f$ in this case is in the form of a split resilient ring which is expanded into the recess $a^5$ in the outer hub $a$ at the rear of the conical or inclined face or seating as shown, to allow the nut $c$ to be placed in position where the latter is then held by allowing the connecting ring $f$ to contract in a recess formed in the nut. Slots or recesses $c^4$ are provided in the nut to enable the connecting ring to be expanded should it be desired to remove the nut $c$ from the outer hub $a$. The arrangement enables the size of the connecting ring to be reduced and also permits of the conical seatings for the outer hub $a$ to be positioned wider apart than shown in the other examples, thus rendering the wheel more stable.

Either of the spanners referred to above may be used with the constructions of wheels described with reference to Figs. 11 and 12.

What I claim and desire to secure by Letters Patent of the United States is:—

1. A vehicle wheel comprising in combination an inner hub, a detachable outer hub non-rotatably fitted on said inner hub, an annular flange on said outer hub, a nut to maintain the outer hub in position on the inner hub, means whereby a spanner can be secured to said nut, a spring controlled locking ring interposed between and engaging said nut and the annular flange on the outer hub.

2. A vehicle wheel comprising in combination an inner hub, an outer hub non-rotatably mounted thereon, a nut carried by the outer hub to maintain the latter in position, a spring controlled locking member carried by said nut and having means which can engage with the nut and the outer hub.

3. A vehicle wheel comprising in combination an inner hub, a detachable outer hub non-rotatably fitted on said inner hub, an annular flange on said outer hub, a nut to maintain the outer hub in position on the inner hub and having a groove by means of which a spanner can be secured to said nut, a locking ring surrounding said nut and adapted to engage with said nut and said outer hub to prevent relative rotation, spring means to force said locking ring into engagement with said nut and outer hub, the said locking ring having an exposed annular portion by means of which the locking ring can be pressed inwardly against the spring means to unlock said outer hub and retaining nut.

4. A vehicle wheel comprising in combination an inner hub, an outer hub detachably and non-rotatably mounted thereon, a nut to maintain the outer hub in position and a locking member interposed between said outer hub and nut and having two sets of peripheral teeth for engaging with peripheral teeth on said nut and on said outer hub respectively, and a spring means for maintaining the locking ring in a position in which the said peripheral teeth are in engagement.

5. A vehicle wheel comprising in combination an inner hub having an inclined seating, a detachable hub, a nut for engaging with said inner hub and connected to said outer hub by a ring fitting in grooves in the nut and a suitable part of the hub, said nut also having an inclined seating, inclined seatings on the detachable hub for engaging with the inclined seatings on the nut and inner hub, and a suitable locking ring surrounding said nut and adapted to engage therewith and with the detachable hub.

In testimony whereof I affix my signature in presence of two witnesses.

WALTER WRIGHT.

Witnesses:
 ALBERT BROWN,
 JOHN ARKLE.